(12) United States Patent
Shen et al.

(10) Patent No.: US 11,692,976 B2
(45) Date of Patent: Jul. 4, 2023

(54) ULTRASONIC SCANNING DEVICE AND AN APPLICATION AND METHOD THEREOF

(71) Applicant: Wuxi Topsound Technology Co., Ltd., Wuxi (CN)

(72) Inventors: Yue Shen, Wuxi (CN); Zhe Deng, Wuxi (CN); Yunhui Huang, Wuxi (CN)

(73) Assignee: Wuxi Topsound Technology Co., Ltd., Wuxi (CN)

( * ) Notice: Subject to any disclaimer, the term of this patent is extended or adjusted under 35 U.S.C. 154(b) by 235 days.

(21) Appl. No.: 16/763,991

(22) PCT Filed: May 14, 2019

(86) PCT No.: PCT/CN2019/086826
§ 371 (c)(1),
(2) Date: May 14, 2020

(87) PCT Pub. No.: WO2020/052252
PCT Pub. Date: Mar. 19, 2020

(65) Prior Publication Data
US 2020/0284766 A1    Sep. 10, 2020

(30) Foreign Application Priority Data
Sep. 14, 2018  (CN) .......................... 201811075406.0

(51) Int. Cl.
*G01N 29/24*    (2006.01)
*G01N 29/06*    (2006.01)
(Continued)

(52) U.S. Cl.
CPC ....... *G01N 29/2493* (2013.01); *G01N 29/069* (2013.01); *G01N 29/225* (2013.01);
(Continued)

(58) Field of Classification Search
CPC ............ G01N 29/2493; G01N 29/069; G01N 29/225; G01N 29/275; G01N 29/28; G01N 2291/048; H01M 10/4285; H01M 10/0525
(Continued)

(56) References Cited

U.S. PATENT DOCUMENTS 3,575,043 A * 4/1971 Allen ................. G01N 29/2493
73/635
5,493,911 A * 2/1996 Hall ....................... G01N 29/07
73/598
(Continued)

FOREIGN PATENT DOCUMENTS

CA          2777155 A1 * 11/2012 ......... G01N 29/2493

*Primary Examiner* — Lisa M Caputo
*Assistant Examiner* — Rose M Miller
(74) *Attorney, Agent, or Firm* — Bayramoglu Law Offices LLC (57) ABSTRACT

An ultrasonic scanning device includes at least one pair of cylindrical rollers. The axes of each pair of cylindrical rollers are parallel to each other. A liquid for transmitting the ultrasound is stored in each cylindrical roller. In use, a pair of cylindrical rollers rotate around their respective axes in reverse directions, the test subject passes between the pair of cylindrical rollers and is tested by ultrasound. The ultrasonic scanning device can be applied in the field of lithium-ion battery testing. The internal flaws and health status of the lithium-ion battery can be determined by acquiring an ultrasonic image in the test subject. The device of the present invention has a simple structure and an ingenious conception, and is ready-to-use and less expensive, which is successfully applied in the field of lithium-ion battery testing.

16 Claims, 8 Drawing Sheets

(51) Int. Cl.
*G01N 29/275* (2006.01)
*G01N 29/28* (2006.01)
*H01M 10/0525* (2010.01)
*H01M 10/42* (2006.01)
*G01N 29/22* (2006.01)

(52) U.S. Cl.
CPC ........... *G01N 29/275* (2013.01); *G01N 29/28* (2013.01); *H01M 10/0525* (2013.01); *H01M 10/4285* (2013.01); *G01N 2291/048* (2013.01)

(58) Field of Classification Search
USPC ........................................................... 73/639
See application file for complete search history.

(56) References Cited

U.S. PATENT DOCUMENTS

| | | | | |
|---|---|---|---|---|
| 6,308,570 | B1* | 10/2001 | Jackson | G01N 29/348 |
| | | | | 73/639 |
| 6,688,178 | B1* | 2/2004 | Schmidt | G01N 29/27 |
| | | | | 73/644 |
| 2021/0350818 | A1* | 11/2021 | Biswas | H04R 1/345 |

* cited by examiner

ULTRASONIC SCANNING DEVICE AND AN APPLICATION AND METHOD THEREOF

CROSS REFERENCE TO THE RELATED APPLICATIONS

This application is the national phase entry of International Application No. PCT/CN2019/086826, filed on May 14, 2019, which is based upon and claims priority to Chinese Patent Application No. 201811075406.0, filed on Sep. 14, 2018, the entire contents of which are incorporated herein by reference.

TECHNICAL FIELD

The present invention belongs to the field of ultrasonic testing, and more specifically, relates to an ultrasonic scanning device and an application and method thereof.

BACKGROUND

Sound waves having frequencies higher than 20 kHz constitute ultrasound. Ultrasound is capable of propagating large distances in liquids and solids because acoustic energy is focused and well-directed. Ultrasound is thus frequently used in the field of non-destructive testing to detect gas in solution, density fluctuations and flaws in objects. However, ultrasound, especially with frequencies higher than 0.5 MHz, have poor propagating capability in air. It is, therefore, difficult to obtain desired ultrasound information through air-coupled ultrasonic inspection. Thus, liquid coupling agents are typically provided between the ultrasonic transducer and the test subject to facilitate the propagation of detectable ultrasound.

In practical applications, in order to obtain a high-quality high-frequency ultrasonic scanning result, the test subject is immersed in water or other liquid mediums, which inevitably causes the test subject to be contaminated. In many applications, the test subject, lithium-ion batteries for example, cannot be submersed in liquid.

Since the reduction of ultrasound through a solid medium is less than that of ultrasound through gaseous medium, it is possible to fill a solid medium between the ultrasonic transducer and the test subject. However, the solid medium does not have flowability, and the relative position between the ultrasonic transducer and the test subject is fixed, so the ultrasonic transducer has difficulties in performing mechanical scanning on the test subject. Moreover, when the ultrasonic transducer is removed from the surface of the test subject and used to detect another test subject, the rigid solid medium will suffer from irreversible damage. In this regard, the ultrasonic transducer cannot continuously scan different test subjects.

Therefore, it is imperative to develop a novel ultrasonic coupling device and method to avoid direct contact between the liquid and the test subject, as well as the direct contact between the rigid solid medium and the rigid test subject, which device and method are simple to operate, reusable, and economical.

SUMMARY

In view of the above-mentioned shortcomings and demands for improvements of the prior art, the objective of the present invention is to provide an ultrasonic scanning device and an application and method thereof. In the present invention, a solid ultrasonic transmission medium is combined with a liquid ultrasonic transmission medium, a transducer is placed in a roller filled with a liquid, the outer wall of the roller is in contact with a test subject, and the transducer moves relative to the test subject by a rotation of the roller, so as to realize the ultrasonic mechanical scanning. The device of the present invention has a simple structure and an ingenious conception, and is ready-to-use and inexpensive, which is successfully applied in the field of lithium-ion battery testing.

In order to achieve the above-mentioned objective, according to one aspect of the present invention, an ultrasonic scanning device is provided. The ultrasonic scanning device includes at least one pair of cylindrical rollers. The axes of each pair of cylindrical rollers are parallel to each other. A liquid for transmitting ultrasound is stored in each cylindrical roller. In use, the pair of cylindrical rollers rotate around their respective axes in reverse directions, the test subject passes between the pair of cylindrical rollers and is tested by the ultrasound. When the test subject passes between the pair of cylindrical rollers, an elastic deformation occurs on the cylindrical roller or the test subject, so that the test subject is well in contact with the pair of cylindrical rollers, thereby ensuring the efficient propagation of the ultrasound.

In another aspect of the present invention, the ultrasonic scanning device includes at least one pair of ultrasonic transducers, and the at least one pair of ultrasonic transducers are provided in the pair of cylindrical rollers. The pair of ultrasonic transducers are respectively arranged in the pair of rollers. The ultrasonic transducer is configured to both emit and receive the ultrasound, and preferably employs a flat ultrasonic transducer or a focused ultrasonic transducer. The flat ultrasonic transducer is configured to emit or receive ultrasound transmitting in a straight direction, the focused ultrasonic transducer is configured to emit the ultrasound focused into the focal zone. Preferably, the pair of ultrasonic transducers are arranged opposite to each other, a line between the ultrasonic signal receiving center point and the ultrasonic signal emitting center point of all the ultrasonic transducers is coplanar with the axes of the two rollers, and perpendicular to the axes of the two rollers. In this way, the ultrasound emitted from one of the transducers can pass through the two rollers and the test subject to reach the other one of the transducers, and are not exposed to air, so as to obtain an accurate local ultrasonic transmission signal of the test subject.

The ultrasonic signal receiving center point and the ultrasonic signal emitting center point of all the ultrasonic transducers are coplanar with the axes of the two rollers. A reciprocation distance of the transducer moving in the axial direction of the roller is greater than a distance between the ultrasonic transducers.

Further, the size of the gap between the pair of cylindrical rollers is fixed.

When the test subject is detected, at least one pair of ultrasonic transducers reciprocate in the axial direction of the roller, so that the ultrasonic transducer performs the mechanical scanning on the test subject in the axial direction of the roller. The test subject is simultaneously in contact with the cylinder walls of the two rollers when passing through the gap, and one roller of the pair of rollers is provided with an actuating device and rotated at a predetermined angular velocity. Meanwhile, the other roller of the pair of rollers is not provided with the actuating device and rotated under the action of friction accordingly during operation.

In this way, the ultrasonic transducer performs the mechanical scanning on the test subject in the normal direction (defined as the x-direction) of the plane of the axes of the two rollers. The gap described herein is adjustable, for example, if the test subject is excessively thin and the wall of the roller is soft enough, the outer walls of the two rollers can be directly in contact with each other in the initial state. During working, the test subject is squeezed between the two rollers and passes through the two rollers by the deformation of the cylinder walls of the two rollers.

In another aspect, the included angle between the axial direction of the pair of cylindrical rollers and the horizontal plane is 15°-90°, and the roller is an open container.

In yet another aspect, the outer wall surface of the roller is made of a macromolecular polymer material, and the macromolecular polymer material is preferably silicone rubber, which can ensure that the rigid test subject is well in contact with the two rollers when passing through the gap between the two rollers. Preferably, a liquid is sealed and filled in the macromolecular polymer material, so as to make the outer wall surface softer than the outer wall surface using soft macromolecular polymer alone, which can ensure that the rigid test subject is well in contact with the two rollers when passing through the two rollers.

In still another aspect, the direction and the relative position of the two rollers can be designed by the following three manners:

In the first manner: the heights of the two rollers are equal, the axis of the roller is perpendicular to the horizontal plane. The ultrasonic testing device includes a horizontal conveyor belt. A cube-shaped test subject is placed on the conveyor belt. The conveyor belt is located between the two rollers and carries the test subject into the gap between the two rollers when working. This device is referred to as a "vertical roller type ultrasonic scanning device" in the present invention, and configured to perform ultrasonic scanning on articles that can be placed vertically on the conveyor belt, e.g., cube-shaped aluminum shell lithium-ion batteries.

In the second manner: the included angle between the axial direction of the roller and the horizontal plane is 15°-40° and equal to the included angle between the plane of the axes of the two rollers and the horizontal plane. The line of intersection of the plane of the axes of the two rollers and the horizontal plane is perpendicular to the axes of the two rollers. Hereinafter, this device is referred to as a "horizontally arranged inclined roller type ultrasonic scanning device". The test subject enters the gap between the two rollers from above the two rollers, and is driven by the rotation of the two rollers to pass through the gap and falls under the two rollers.

In the third manner: the centers of the bottoms of the two rollers are not of equal height, and the included angle between the axis of the roller and the horizontal plane is 15°-80°. The plane of the axes of the two rollers is perpendicular to the horizontal plane. Hereinafter, this device is referred to as a "vertically arranged inclined roller type ultrasonic scanning device". The test subject is placed on the inclined conveyor belt and carried into the gap of the two rollers, and is driven by the rotation of the two rollers to pass through the gap and falls on another inclined conveyor belt.

The inclined roller type ultrasonic scanning device (including the horizontally arranged inclined roller type ultrasonic scanning device and the vertically arranged inclined roller type ultrasonic scanning device) is configured to perform ultrasonic scanning on thin objects that cannot be placed vertically, e.g., soft-pack lithium-ion batteries.

Further, the diameter of the roller is greater than 100 mm to ensure a sufficiently large curvature radius of the outer surface of the roller, and the soft macromolecular polymer layer is slightly compressed in the radial direction to form seamless contact with a large area of the test subject by being.

Further, the included angle between the axial direction of the two rollers and the horizontal plane is set as 15°-90° to prevent the liquid in the roller from flowing out when the upper end of the roller is not sealed. The upper end of the roller is not sealed to allow the ultrasonic transducer support to extend into the roller and move relative to the roller.

According to the second aspect of the present invention, an application of the ultrasonic scanning device as described above in the field of lithium-ion battery testing is provided and used for detecting a state of a lithium-ion battery.

According to another aspect of the present invention, the method for obtaining an ultrasonic image by using the device as described above specifically includes:

defining the normal direction of the plane of the axes of the pair of rollers as x, defining the angular velocity of the roller as $\omega_1$, defining the minimum distance between the axis of the roller and the test subject during the working process as R, and defining the scanning time as t; wherein the displacement X of the ultrasonic transducer relative to the test subject in the x-direction is $X=\omega_1 R_t$;

defining the direction parallel to the axis of the roller as y, wherein the pair of ultrasonic transducers reciprocate in the y-direction with a frequency of p, and the relationship between the displacement Y of the pair of ultrasonic transducers and t is $Y=f(t)$;

defining the signal strength detected by the pair of ultrasonic transducers at time t as S, then establishing the relationship between S, X and Y according to the known quantities of t, X, Y and S at a certain time, adding a false color on S and preparing an image according to the relationship between S, X and Y, wherein the image is the ultrasonic image of the test subject, and the ultrasonic image can reflect ultrasonic transmission characteristics at different positions of the test subject.

In general, compared with the prior art, the above-mentioned technical solutions conceived by the present invention have the following advantages:

In the device of the present invention, a solid ultrasonic transmission medium is combined with a liquid ultrasonic transmission medium, the transducer is placed in a roller filled with a liquid, the outer wall of the roller is in contact with the test subject, and the transducer moves relative to the test subject by the rotation of the roller, so as to realize the ultrasonic mechanical scanning. The device of the present invention has a simple structure and an ingenious conception, is convenient to use and less expensive, which is successfully applied in the field of lithium-ion battery testing.

When used in the lithium-ion battery testing, the method of the present invention can realize a high-precision and rapid ultrasonic scanning analysis, obtain a distribution diagram of the ultrasonic transmission characteristics and reflection characteristics of the test subject, and accurately analyze physical quantities such as ultrasound intensity and ultrasound time of flight, which has a signal-to-noise ratio superior to that of the air coupling technology. Furthermore, the present invention will not contaminate the battery with liquid medium, and the distribution of the electrolyte inside the battery and flaws of the electrode can be observed, which improves components of lithium-ion battery products and eliminates defective batteries.

1—inner wall of the roller; 2—outer wall of the roller; 3—ultrasonic transducer; 4—liquid medium; 5—test subject; 6—conveyor belt; 7—ultrasonic transducer support; 8—roller support shaft; 9—roller; 10—linear slider; 11—rotating crank; 12—bar; 13—silicone rubber; 14—liquid;

DETAILED DESCRIPTION OF THE EMBODIMENTS

In order to clearly describe the objectives, technical solutions and advantages of the present invention, hereinafter, the present invention is further illustrated in detail with reference to the drawings and embodiments. It should be understood that the specific embodiments described herein are only used to explain the present invention rather than to limit the present invention. In addition, the technical features involved in the various embodiments of the present invention described hereinafter can be combined when not in conflict with one another.

Figure 1:
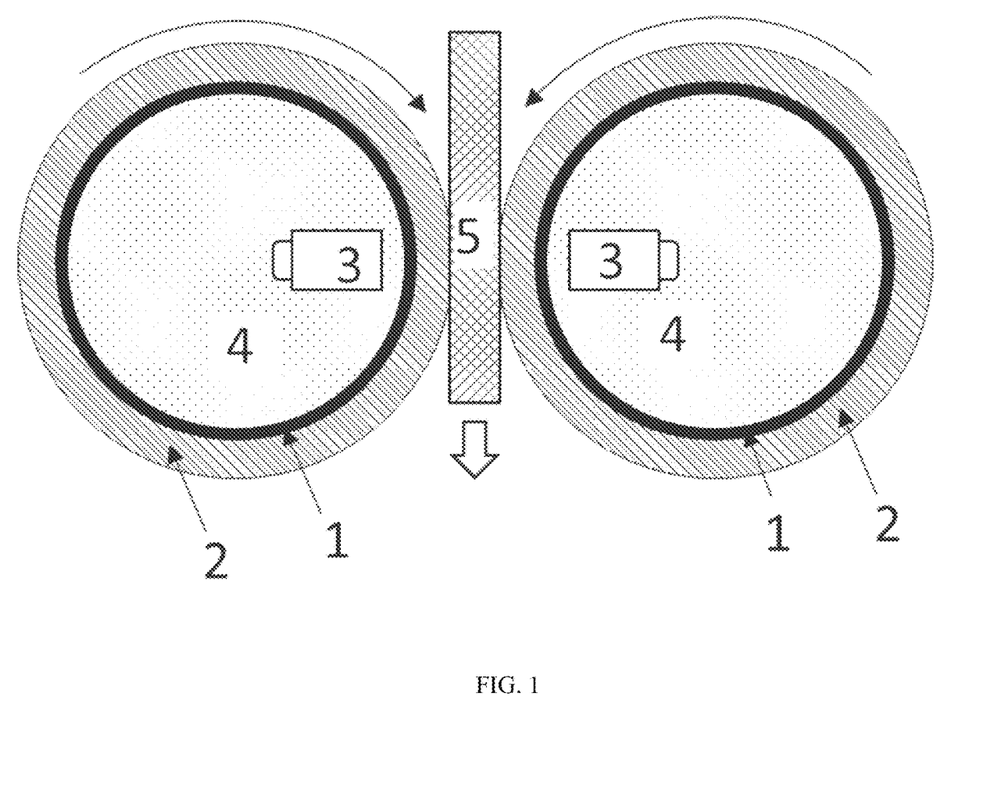
FIG. 1 is a top cross-sectional view of the vertical roller type ultrasonic scanning device according to an embodiment of the present invention.

FIG. 1 is a top cross-sectional view of the vertical roller type ultrasonic scanning device according to an embodiment of the present invention. As shown in FIG. 1, the vertical roller type ultrasonic scanning device includes a pair of cylindrical rollers, and the axes of each pair of cylindrical rollers are parallel to each other. The pair of cylindrical rollers each have an opening, and are filled with the liquid medium 4 for transmitting ultrasound. The ultrasonic transducer 3 is immersed in the liquid medium. The inner wall 1 of the roller and the outer wall 2 of the roller are made of different materials, and the test subject 5 is located in the gap between the two rollers.

The device and method of the present invention will be more expressly described hereinafter with reference to the specific embodiments and drawings.

Embodiment 1: Vertical Roller Type Ultrasonic Scanning Device Configured to Detect Internal Flaws of Cube-Shaped Batteries Currently, cube-shaped aluminum shell lithium-ion batteries are common on the automotive battery market and has a cubic appearance. A multi-layer coiled or laminated electrode material, a separator, and a current collector are contained inside a cube-shaped aluminum shell lithium-ion battery and immersed in the electrolyte. Ultrasound can be employed to detect internal flaws in pole pieces, the distribution of the filled electrolyte, internal gases, and others, which significantly ensures the quality of the battery. In the present embodiment, a cube-shaped aluminum shell lithium-ion battery sized 150 mm×100 mm×30 mm is used as the test subject.

The inner wall of the roller is made of polymethyl methacrylate, and has an outer diameter of 200 mm, a wall thickness of 3 mm, and a height of 300 mm. The bottom of the roller is closed, and the upper end of the roller is open. The axis of the roller is perpendicular to the horizontal plane. The roller is covered with a layer of silicone rubber with a thickness of 10 mm as the outer wall of the roller. The silicone rubber outer wall covers most of the vertical surface of the polymethyl methacrylate inner wall except for the area of 20 mm from the top of the roller. The area is in contact with an auxiliary wheel to ensure the positioning of the roller. A 29 mm gap is formed between the two rollers, so that the 30-millimeter-thick cube-shaped battery can pass through the gap as the roller rotates. During this process, the silicone rubber outer wall of the roller is squeezed and deformed slightly. The silicone rubber layer on each side is compressed at most 0.5 mm to seamlessly contact the battery. Given the deformation of the silicone rubber layer, the minimum distance R between the axis of the roller and the test subject during the working process is 109.5 mm.

Figure 2:
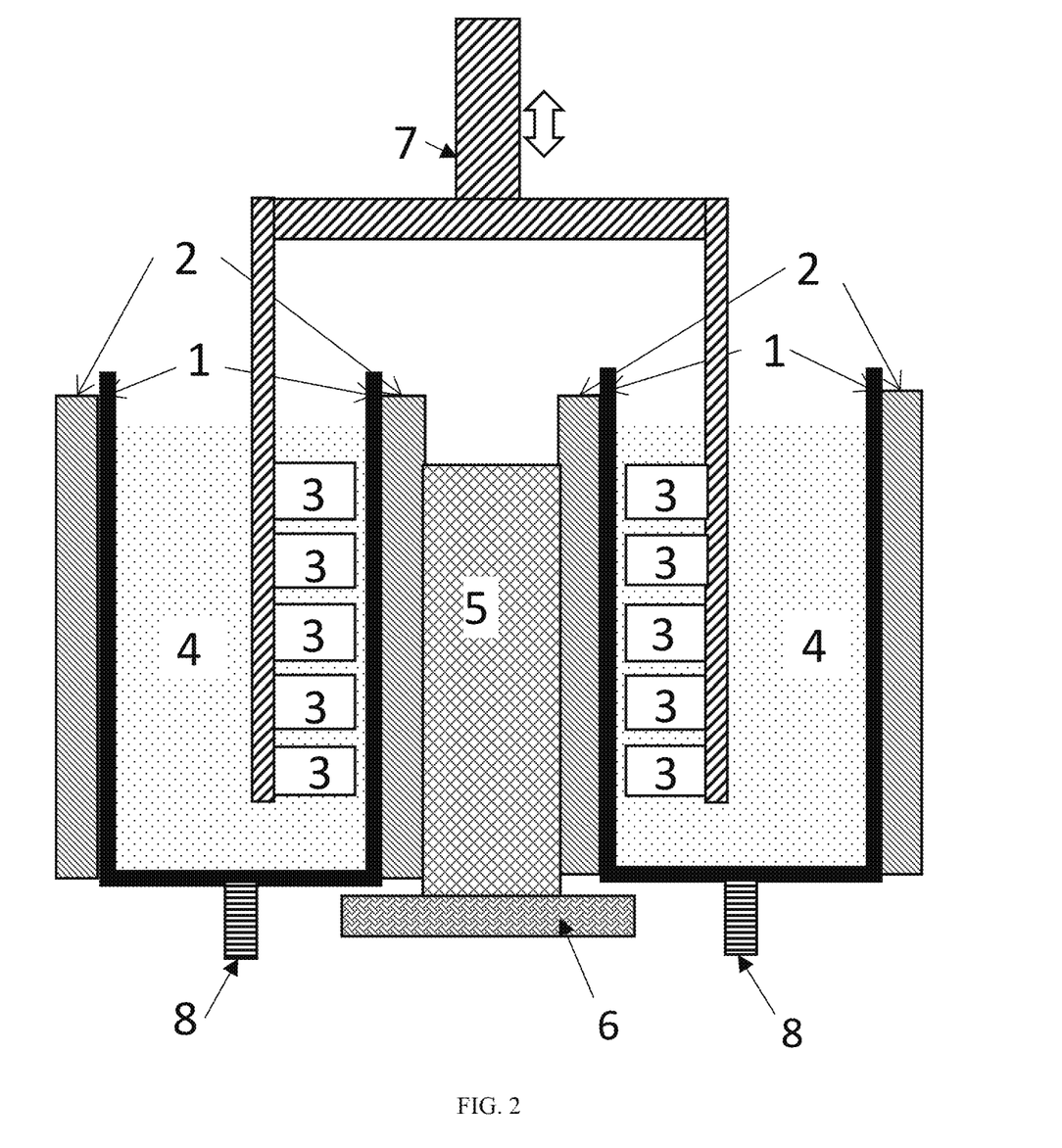
FIG. 2 is a cross-sectional view of the vertical roller type ultrasonic scanning device according to an embodiment of the present invention.

Referring to FIG. 2, the ultrasonic transducer includes five pairs of flat ultrasonic transducers including a transducer disk with a diameter of 6 mm, and the five pairs of flat ultrasonic transducers are distributed and installed on the two arms of the ultrasonic transducer support, as shown in FIG. 2. FIG. 2 is a cross-sectional view of the vertical roller type ultrasonic scanning device according to an embodiment of the present invention. As shown in FIG. 2, the transducer support 7 is provided with five pairs of transducers, the test subject 5 is located on the conveyor belt 6, and the distance between the centers of each pair of transducers in the vertical direction is 20 mm. The transducer is immersed in the silicone oil in the roller, and the silicone oil level is 50 mm below the top of the inside of the roller to prevent the silicone oil from overflowing from the roller when the transducer support reciprocates in the y-direction along with the transducer. The silicone oil has stable, non-volatile and non-corrosive chemical properties, and thus is selected as the liquid ultrasonic transmission medium in the present embodiment. The centers of the transducers are coplanar with the plane of the axes of the two rollers, and the distance between the transducer and the inner wall of the roller is 3 mm. The ultrasonic transducer is configured to both emit and receive 1 MHz ultrasound. The ultrasound emitted by the ultrasonic transducers of the roller at one side can penetrate the test subject and are directly captured by the ultrasonic transducers of the opposite roller at the other side.

Figure 3:
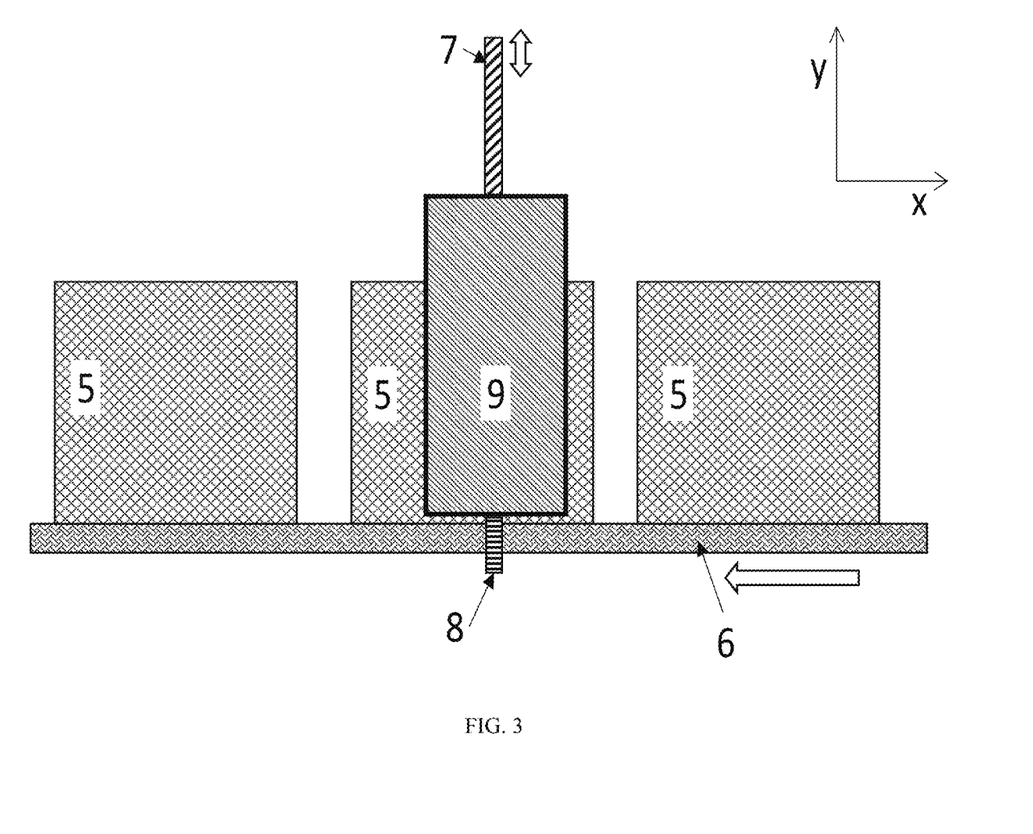
FIG. 3 is a structural schematic diagram of the vertical roller type ultrasonic scanning device and the conveyor belt according to an embodiment of the present invention.

FIG. 1 and FIG. 2 show the overall structure of the vertical roller type ultrasonic scanning device, wherein FIG. 1 is a top view and FIG. 2 is a side view taken from the x-direction. FIG. 3 is a structural schematic diagram of the vertical roller type ultrasonic scanning device and the conveyor belt according to an embodiment of the present invention. The liquid medium for transmitting ultrasound is stored in the roller 9, and the transducer support 7 is placed in the liquid medium. A plurality of pairs of transducers are arranged on the transducer support 7. The test subjects are successively arranged on the conveyor belt 6. The roller is supported by the roller support shaft 8 and thus can rotate around the axis of the roller support shaft.

Figure 4:
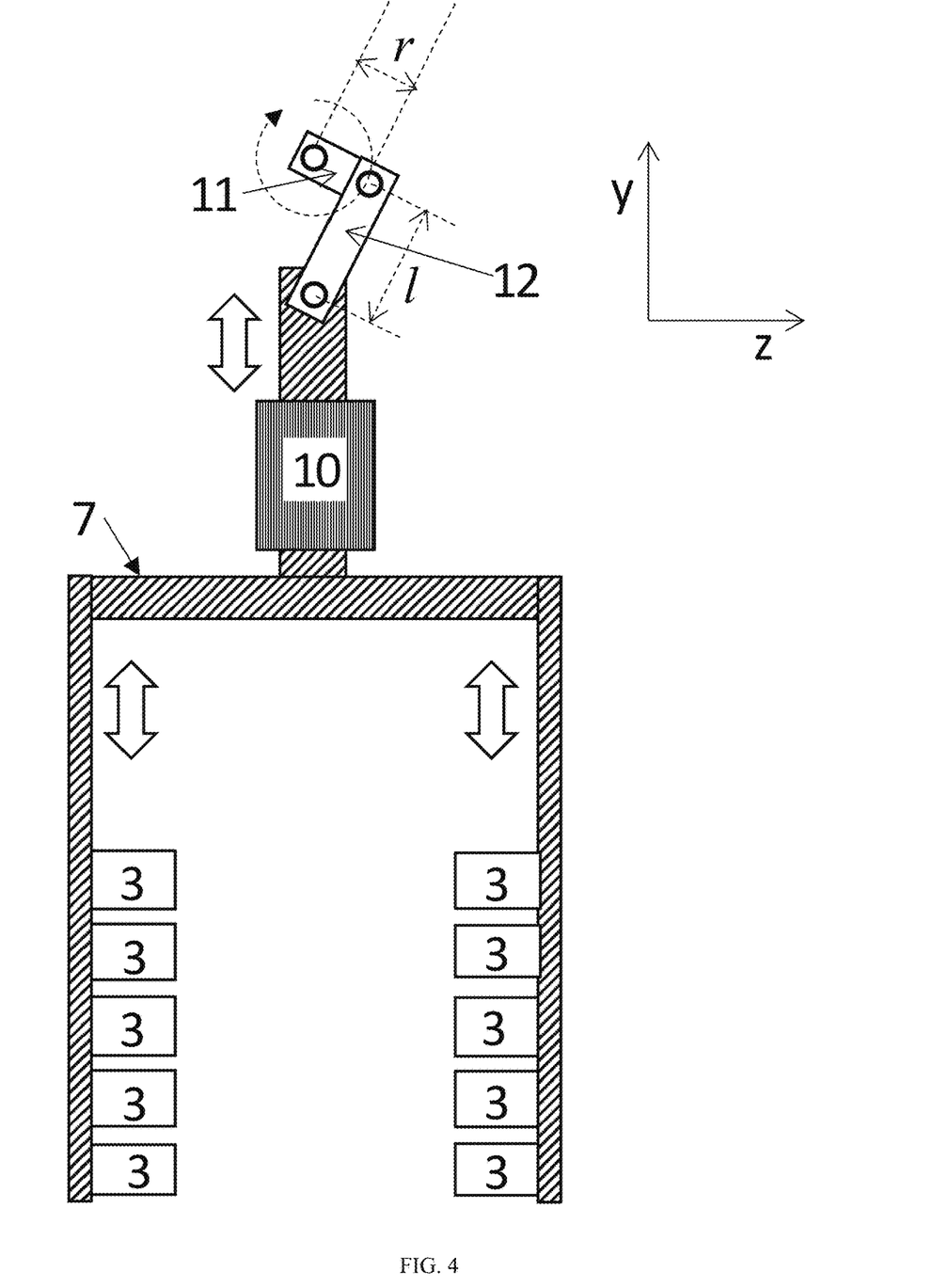
FIG. 4 is a structural schematic diagram of the ultrasonic transducer support and a crank linkage for driving the ultrasonic transducer support according to an embodiment of the present invention.

In use, the cube-shaped battery to be detected is placed on the conveyor belt shown in FIG. 2 and FIG. 3, and the speed of the conveyor belt is synchronous with the rotation of the roller. The speed v of the conveyor belt is 10 mm/s, and the angular velocity of the roller is $\omega_1=v/R=1.826$ rad/s. FIG. 4 is a structural schematic diagram of the ultrasonic transducer support and the crank linkage for driving the ultrasonic transducer support to move according to an embodiment of the present invention. With reference to FIG. 4, the ultrasonic transducer support 7 is driven by a stepping motor to reciprocate under the action of the crank linkage. Specifically, the stepping motor drives the linear slider 10 to move by the rotating crank 11 and the bar 12, and then drives the ultrasonic transducer support 7 to move by the linear slider. The effective length r of the crank is 10 mm, and the effective length l of the bar is 15 mm. The angular velocity $\omega_2$ of the stepping motor is $10\pi/s$ and keeps constant, i.e., 5 revolutions per second. If the initial state t=0, the included angle between the crank and the bar is 0°, a certain transducer is located at $(X_0, Y_0)$ relative to the cube-shaped battery, then, at a subsequent time t, the ultrasonic transducer is located at $(X, Y)$ relative to the cube-shaped battery, and the following relationships can be obtained by solving the triangle:

$$X = X_0 + \omega_1 tR = X_0 + 10tmm/s$$

$$Y = Y_0 + l - r - \sqrt{l^2 - f^2\sin^2(\omega_2 t)} + r\cos(\omega_2 t) =$$

$$Y_0 + \left[5 + 10\cos(10\pi t/s) - \sqrt{225 - 100\sin^2\left(\frac{10\pi t}{s}\right)}\right] mm$$

Accordingly, the position $(X, Y)$ of the ultrasonic transducer relative to the test subject in the x, y plane can be determined by the time t.

A square wave voltage pulse with a fixed amplitude is employed to excite the ultrasonic transducer. The ultrasound emitted by the ultrasonic transducer passes through the silicone oil on a side of the roller where the ultrasonic transducer is located→the inner wall on the side of the roller→the outer wall on the side of the roller→the cube-shaped battery→the outer wall of the opposite roller→the inner wall of the opposite roller→the silicone oil in the opposite roller, and then reach another ultrasonic transducer. The ultrasonic vibration waveform received is recorded, the maximum peak-peak value is recorded as S, and 1000 maximum peak-peak values and the corresponding times t are recorded per second. The values of S, X, and Y obtained at different times t are used to prepare a false color image. The red long-wavelength denotes a strong transmission signal, the blue short-wavelength denotes a weak transmission signal, and the green long-wavelength denotes a moderate transmission signal. Then, the distribution information of ultrasonic signal transmission intensities of the cube-shaped battery in the scanning area of the transducer can be obtained. The distribution diagrams of the ultrasonic signal transmission intensities in the respective scanning areas of the multiple ultrasonic transducers are conjoined with one another to obtain the distribution diagram of the ultrasonic signal transmission intensities of the entire battery.

If there is gas in the battery (or a part of the electrolyte is not immersed), the ultrasound reflecting off the gas-liquid interface and the gas-solid interface causes a reduction in the ultrasonic transmission intensity of the part of the electrolyte, which is partially blue shown in the false color image. If there is a wrinkle in the electrode inside the battery, a scattering caused by the local thickness difference and the wrinkle causes a reduction in the ultrasonic transmission signal but the reduction due to the wrinkle is generally lower than the a reduction due to the presence of gas.

The presence of gas can also be determined by the ultrasonic reflected signal. After the ultrasonic signal is emitted by the ultrasonic transducer, if there is gas in the battery, the ultrasound is reflected to the transducer within very little time $\tau$ and can also be detected. The value of $\tau$ is directly proportional to the distance between the bubble and the transducer. Such a reflection mode does not require the use of the opposite ultrasonic transducers.

Embodiment 2: Vertical Roller Type Ultrasonic Scanning Device Configured to Detect Internal Flaws of a Cube-Shaped Rubber Block In the present embodiment, a cube-shaped rubber block sized 150 mm×100 mm×50 mm is used as the test subject. Most of the structures of the ultrasonic scanning device are the same as that of embodiment 1, except for the following differences:

Since the test subject is elastic, the overall thickness of the test subject is 20 mm greater than the thickness of the cube-shaped battery in embodiment 1. Therefore, the silicone rubber outer wall is not covered on the two rollers, the inner wall of the polymethyl methacrylate roller is directly in contact with the test subject, and the test subject is deformed to pass through the 49 mm gap between the two rollers.

The test subject has a larger thickness in the z-direction and can be stably placed on the conveyor belt. Therefore, the width of the conveyor belt is adjusted to 45 mm, and the conveyor belt is lifted to be higher than the lower edge of the roller, which is conducive to avoiding the scanning blind area at the lower edge of the test subject.

If there is a bubble with a diameter greater than 2 mm in the test subject, this scanning device can be employed to determine a decrease in the ultrasonic transmission signal in an area where the bubble is located in the x-y plane, and the depth in the z-direction can be determined by the delay $\tau$ of the reflected signal. The value of $\tau$ is directly proportional to the distance between the bubble and the transducer.

If there is a stone with a diameter of 5 mm in the test subject, the scanning device can be employed to determine an increase in the ultrasonic transmission signal in an area where the stone is located in the x-y plane, and the depth in the z-direction can be determined by the delay $\tau$ of the reflected signal. The larger value of $\tau$ is directly proportional to the distance between the stone and the transducer.

Embodiment 3: Horizontally Arranged Inclined Roller Type Ultrasonic Scanning Device Configured to Detect Internal Flaws of a Soft-Pack Battery Soft-pack lithium-ion batteries are also common batteries available on the market and have a cubic appearance. The soft-pack lithium-ion battery differs from the cube-shaped aluminum shell battery in that the soft-pack battery is packaged by an aluminum-plastic film. A multi-layer electrode material formed by lamination, a separator, and a current collector are provided inside the soft-pack lithium-ion battery and immersed in the electrolyte. The thickness of the soft-pack lithium-ion battery is generally less than 15 mm. The soft-pack lithium-ion battery has a folded edge with the aluminum-plastic film and thus cannot be vertically placed on the conveyor belt. The present invention provides the inclined roller type ultrasonic scanning device to realize the continuous scanning of soft-pack lithium-ion batteries.

Figure 5:
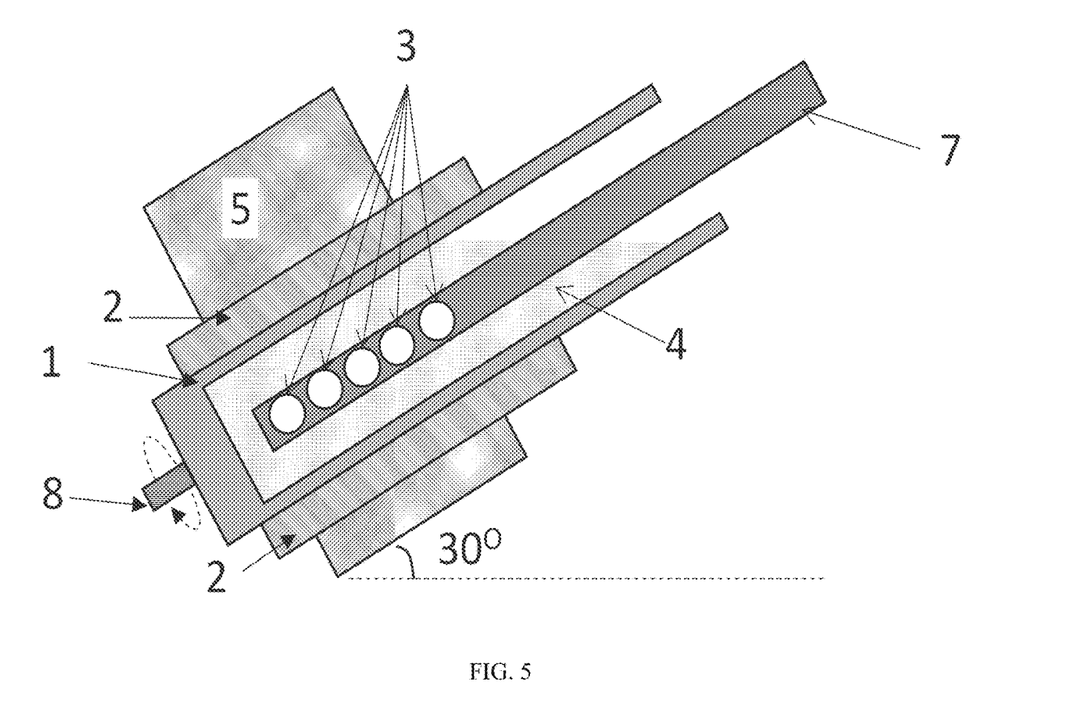
FIG. 5 is a schematic diagram showing the horizontally arranged inclined roller type ultrasonic scanning device according to an embodiment of the present invention.

The horizontally arranged inclined roller type ultrasonic scanning device differs from the vertical inclined roller type ultrasonic scanning device described in embodiment 1 in that the included angle between the axial direction of the two rollers and the horizontal plane is 15°-40°, and the two rollers rotate around the respective axes of the two rollers. In the present embodiment, FIG. 5 is a schematic diagram showing the horizontally arranged inclined roller type ultrasonic scanning device according to an embodiment of the present invention. The included angle between the axial direction of the two rollers and the horizontal plane is 30°. FIG. 5 is a view taken from the z-direction. The two rollers are arranged side by side, whereas only the internal structure of the roller on one side is shown in FIG. 5. The roller on the other side is shielded. In this arrangement, when the upper end of the roller is not sealed, the liquid in the roller will not flow out of the roller, and the transducer is fully immersed in the roller to ensure the ultrasonic transmission. In operation, the soft-pack battery enters the gap between the two rollers from above the two rollers. The battery pack is driven by the rotation of the two rollers to pass through the gap and falls under the two rollers and is carried by the conveyor belt to realize continuous scanning.

In the present embodiment, the size of the soft pack battery to be detected is 80 mm×50 mm×6 mm.

The two rollers are of equal size and specification. The inner wall of the roller is made of aluminum alloy, and has an outer diameter of 120 mm, a height of 300 mm, and a wall thickness of 3 mm. The bottom end of the roller is closed, and the upper end of the roller is open. The inner wall is covered with a silicone rubber outer wall with a thickness of 10 mm. The area covered by the silicone rubber is 10 mm above the bottom of the inner wall of the roller to 100 mm below the top of the inner wall of the roller. The two rollers are obliquely placed side by side with no difference in height, and the included angle between the axial direction of the roller and the horizontal plane is 30°. The area on the inner wall of the roller can be in contact with the auxiliary wheel without being wrapped by the outer wall to ensure the positioning of the roller. A 5 mm gap is formed between the two rollers, and a cube-shaped battery with a thickness of 6 mm can pass through the gap as the roller rotates. During the passage, the silicone rubber outer wall of the roller is deformed slightly. The silicone rubber layer on each side is compressed a distance not greater than 0.5 mm to seamlessly contact the battery. Given the deformation of the silicone rubber layer, the minimum distance R between the axis of the roller and the test subject during the working process is 69.5 mm. The rotational speed $\omega_1$ of the roller is 0.1439 rad/s and is constant. The roller is filled with silicone oil as the liquid ultrasonic transmission medium, and the silicone oil level is 50 mm below the mouth of the roller.

The ultrasonic transducer includes five pairs of flat ultrasonic transducers including a transducer disk with a diameter of 6 mm, and the five pairs of flat ultrasonic transducers are distributed and installed on the two arms of the ultrasonic transducer support shown in FIG. 5. The distance between the centers of each pair of transducers is 12 mm. The transducers are immersed in the silicone oil in the roller. The centers of all the transducers are coplanar with the plane of the axes of the two rollers, and a distance between the center of the transducer and the inner wall of the roller are 3 mm. The ultrasonic transducer is configured to both emit and receive 1 MHz ultrasound. The ultrasound emitted by the ultrasonic transducers of the roller at one side penetrates the soft-pack battery to be detected and are directly captured by the ultrasonic transducers of the opposite roller at the other side. The ultrasonic transducer support 7 is driven by a stepping motor to reciprocate under the action of the crank linkage. The effective length r of the crank is 6 mm, and the effective length l of the bar is 10 mm. The angular velocity $\omega_2$ of the stepping motor is 10π/s and is constant, i.e., 5 revolutions per second. The scanning range of all transducers in the y-direction is 60 mm.

The battery is placed in the gap between the two rollers from above the gap in the direction shown in FIG. 5. It should be noted that the area where the soft-pack battery is located within the scanning range of the transducer in they-direction to ensure that the transducer scans the entire soft-pack battery. The ultrasonic transducer is configured to both emit and receive 1 MHz ultrasound. The ultrasound emitted by the ultrasonic transducer of the roller at one side can penetrate the test subject and are directly captured by the ultrasonic transducers of the opposite roller at the other side.

If the initial state t=0, the included angle between the crank and the bar is 0°, a certain transducer is located at ($X_0$, $Y_0$) relative to the soft-pack battery, then, at a subsequent time t, the ultrasonic transducer is located at (X, Y) relative to the soft-pack battery, and the following relationships can be obtained by solving the triangle:

$$X = X_0 + \omega_1 tR = X_0 + 10t mm/s$$

$$Y = Y_0 + l - r - \sqrt{l^2 - r^2\sin^2(\omega_2 t)} + r\cos(\omega_2 t) =$$

$$Y_0 + \left[4 + 6\cos(10\pi t/s) - \sqrt{100 - 36\sin^2\left(\frac{10\pi t}{s}\right)}\right] mm$$

Accordingly, the position (X, Y) of the ultrasonic transducer relative to the test subject in the x, y plane can be obtained by the time.

A square wave voltage pulse with a fixed amplitude is employed to excite the ultrasonic transducer. The ultrasound emitted by the ultrasonic transducer passes through the silicone oil on a side of the roller where the ultrasonic transducer is located→the inner wall on the side of the roller→the outer wall on the side of the roller→the soft-pack battery→the outer wall of the opposite roller→the inner wall of the opposite roller→the silicone oil in the opposite roller, and then reach another ultrasonic transducer. The received ultrasonic vibration waveform is recorded, the maximum peak-peak value is recorded as S. Different values of S, X, and Y obtained at different times t are used to prepare a false color image. Then, the distribution information of ultrasonic signal transmission intensities of the soft-pack battery in the scanning area of the transducer can be obtained. The distribution diagrams of the ultrasonic signal transmission intensities in the respective scanning areas of the multiple ultrasonic transducers are conjoined with one another to obtain the distribution diagram of the ultrasonic signal transmission intensities of the entire battery.

If there is gas in the battery (or a part of the electrolyte is not immersed), ultrasound reflecting off the gas-liquid interface and the gas-solid interface causes a reduction in the ultrasonic transmission intensity of the part of the electrolyte, which is partially blue shown in the false color image. If there is a wrinkle in the electrode inside the battery, a scattering caused by the local thickness difference and the wrinkle causes a reduction in the ultrasonic transmission signal, but the reduction due to the wrinkle is generally lower than the reduction due to the presence of the gas.

The presence of gas can also be determined by the ultrasonic reflected signal. After the ultrasonic signal is emitted by the ultrasonic transducer, if there is gas in the battery, the ultrasound is reflected back to the transducer within very little time r and can also be detected. The larger value of r is directly proportional to the distance between the bubble and the transducer. Such a reflection mode does not require the use of the opposite ultrasonic transducers.

For a fresh non-defective soft-pack lithium-ion battery, the positive electrode material, the negative electrode material and the separator inside the battery are all immersed by the electrolyte, the materials of each layer are uniformly distributed without gas. The values of S, X, and Y obtained by scanning are used to prepare the false color image in which the battery is shown in uniform green. The long-term use will aggravate the health status of the battery and degrade the battery capacity to 80% of the fresh state. The secondary reactions cause the non-uniformity inside the battery and generates a local gas, thereby resulting in a non-uniform intensity of the ultrasonic transmission signal. Thus, the false color image shows non-uniform blue and green distribution. After a destruction test at 80° C. for 24 hours, the solid electrolyte interface (SEI) film inside the battery is decomposed and the health status severely deteriorates. As a result, a large amount of gas is generated to impair the ultrasonic transmission performance of the battery, which shows blue shown in the false color image.

Embodiment 4: Vertically Arranged Inclined Roller Type Ultrasonic Scanning Device Configured to Detect Internal Flaws of a Soft-Pack Battery In the present embodiment, the test subject is still a soft-pack lithium-ion battery with the same size as that in embodiment 3. The specifications, sizes and arrangement of the ultrasonic transducers on the ultrasonic transducer support are also the same as those in embodiment 3. The materials, diameters, rotational speeds, gap, inner/outer wall thicknesses of the two rollers are the same as those in embodiment 3. The difference between the present embodiment and embodiment 3, however, is the inner wall height and arrangement.

Figure 6:
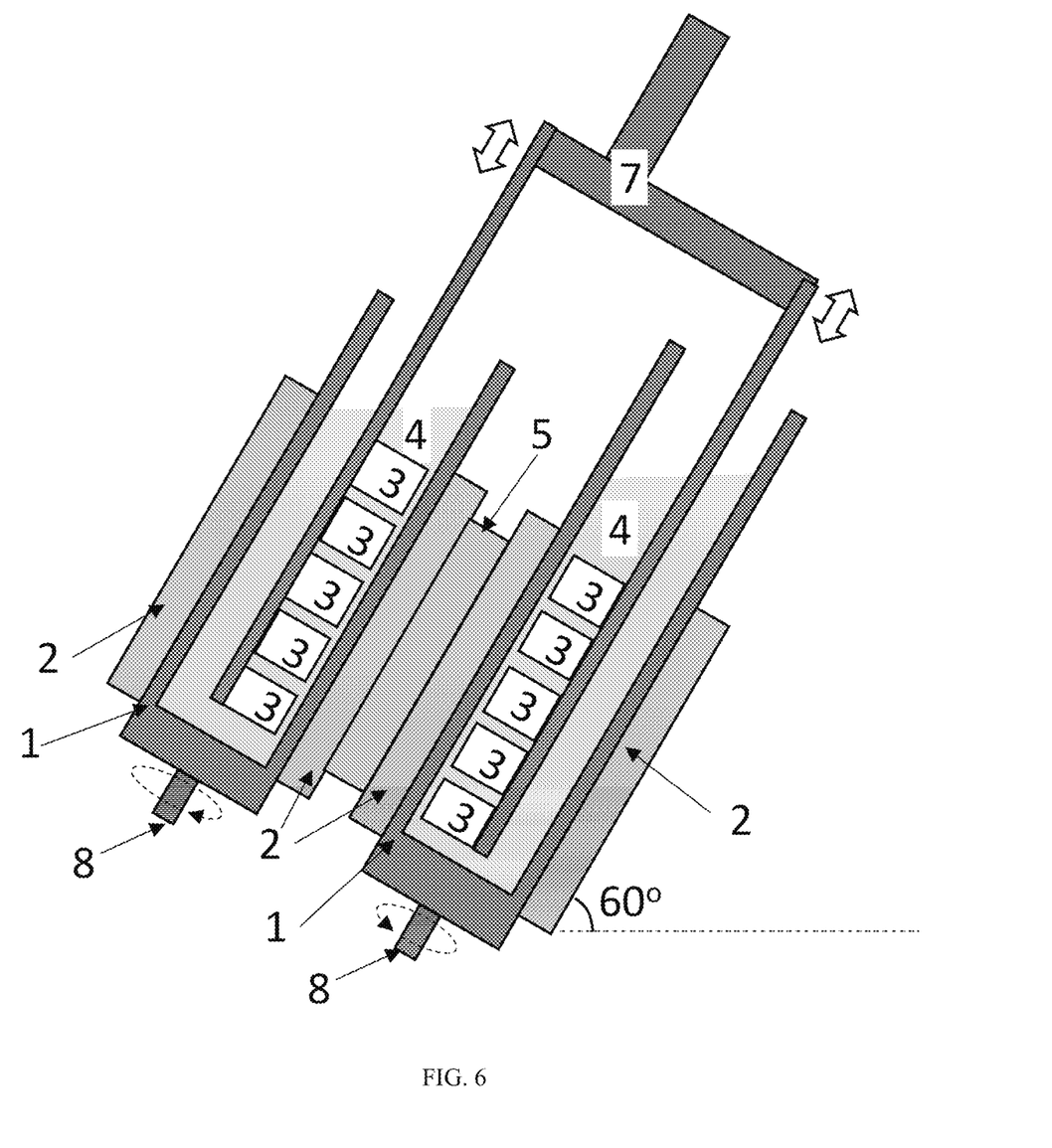
FIG. 6 is a cross-sectional view showing the vertically arranged inclined roller type ultrasonic scanning device according to an embodiment of the present invention.

In the present embodiment, the two rollers have different heights at different position, and the included angle between the respective axis of each of the two rollers and the horizontal plane is 60°. The plane of the axes of the two rollers is perpendicular to the horizontal plane, as shown in FIG. 6, which is a cross-sectional view showing the vertically arranged inclined roller type ultrasonic scanning device according to an embodiment of the present invention. The height of the inner wall of the upper roller is 180 mm, and the height of the inner wall of the lower roller is 220 mm. In this way, the ultrasound emitted by the ultrasonic transducers will not encounter the air layer when transmitting, the silicone oil is filled between the inner wall of the lower side of the upper roller and the transducer, and between the inner wall of the upper side of the lower roller and the transducers. In the inclined structure shown in FIG. 6, the height of the inner wall of the lower roller is designed to be higher than that of the upper roller in consideration of the position of the horizontal liquid level formed by the silicone oil under gravity, so as to prevent the silicone oil from overflowing as well as effectively utilize the space.

The bottom ends of the inner walls of the two rollers are coplanar, and the silicone rubber outer wall covers the area of 10 mm to 110 mm above the bottom end of the inner wall of the roller. The lower roller is provided with an actuating device and rotated at a rotational speed $\omega_1$ of 0.1439 rad/s, while the upper roller can rotate freely, when the test subject enters the gap between the two rollers, the upper roller can rotate accordingly under the action of friction.

Figure 7:
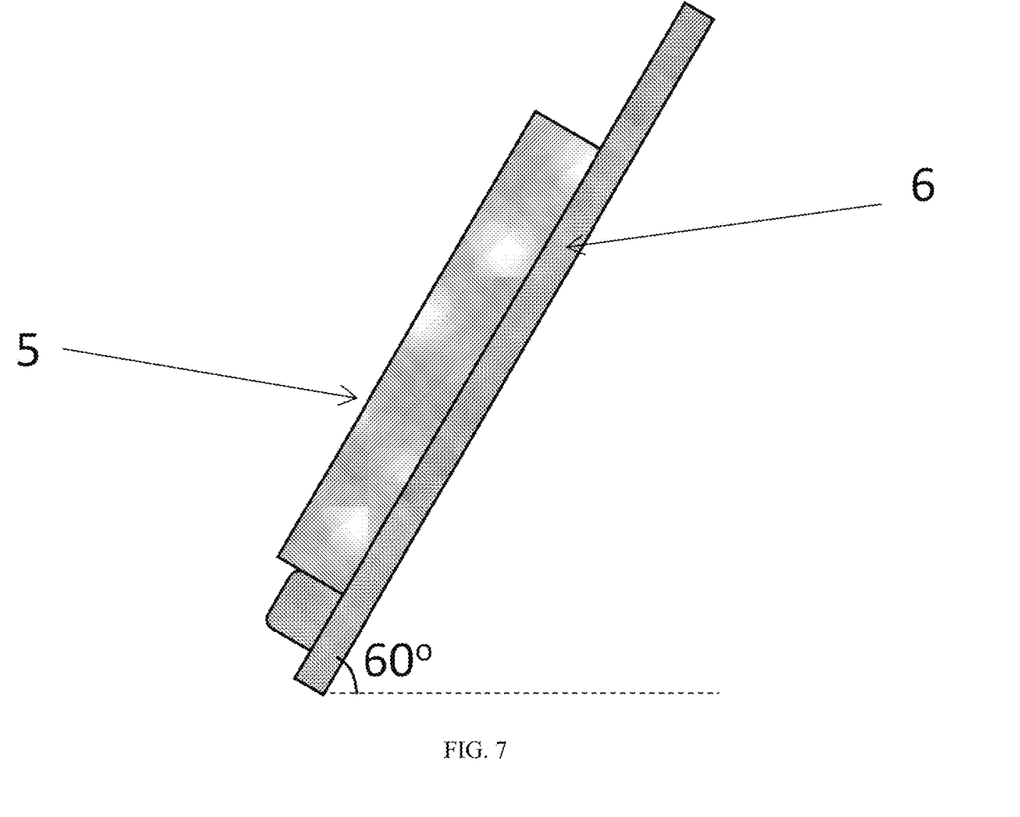
FIG. 7 is a schematic diagram showing the test subject that is placed on the inclined conveyor belt according to an embodiment of the present invention.

The inclined conveyor belt shown in FIG. 7 can be employed to introduce the sample into this device. FIG. 7 is a schematic diagram showing the test subject that is placed on the inclined conveyor belt according to an embodiment of the present invention. The inclined angle between the inclined conveyor belt and the horizontal plane is 60°. The lower side of the conveyor belt is provided with a protrusion to prevent the untested soft-pack battery from slipping. The conveyor belt can feed the soft-pack battery into the gap between the two rollers at the correct angle. The soft-pack battery after being scanned falls on another inclined conveyor belt to achieve continuous scanning of a large number of samples.

Embodiment 5: High-Precision Vertically Arranged Inclined Roller Type Ultrasonic Scanning Device Configured to Detect Internal Flaws of a Soft-Pack Battery In the present embodiment, the test subject is still a soft-pack lithium-ion battery with the same size as that in embodiment 4. The materials, diameters, rotational speeds, gap, inner/outer wall thicknesses of the two rollers are the same as those in embodiment 4.

In the present embodiment, in order to improve the scanning accuracy of the scanning system, the flat ultrasonic transducer with a diameter of 6 mm in embodiment 4, however, is replaced with a focused ultrasonic transducer with a diameter of 6 mm and a focal length of 20 mm (the focus is located at the midpoint of the line connecting a pair of transducers). Five pairs of the focused ultrasonic transducers are distributed and installed on the two arms of the ultrasonic transducer support shown in FIG. 5, and the distance between the five pairs of transducers in the z-direction is 12 mm. The transducers are immersed in the silicone oil in the roller. The centers of all the transducers are coplanar with the plane of the axes of the two rollers, and the distance between the centers of all the transducers and the inner wall of the roller is 7 mm.

Since the flat transducer is replaced with the focused transducer, the area of the ultrasonic signal once passing through the battery is reduced. In order to better cover the testing area of the entire battery, the angular velocity of the crank linkage in the present embodiment is twice the angular velocity of the crank linkage in embodiment 4, i.e., $\omega_2 20\pi/s$, and the rest of the testing process is the same as that in embodiment 4. After this method is employed, the resolution of the ultrasonic testing image obtained in the present embodiment is significantly improved compared with that in embodiment 4, which can determine smaller flaws inside the battery.

Embodiment 6: Vertically Arranged Inclined Roller Type Ultrasonic Scanning Device with a Macromolecular Polymer Cylinder Wall Sealed with a Liquid In the present embodiment, the materials of the inner walls, diameters, rotational speeds, gap, sizes, and arrangement of the two rollers are the same as those in embodiment 4 other than the structure of the outer wall that is changed.

Figure 8:
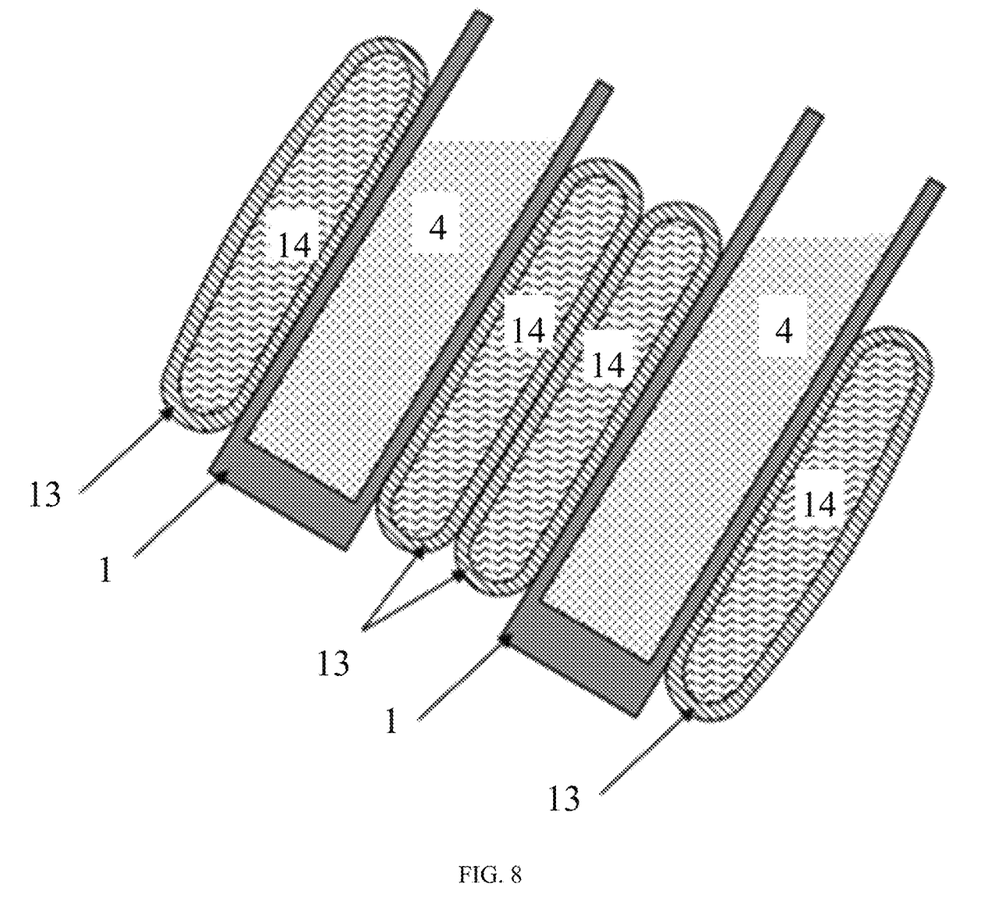
FIG. 8 is a schematic diagram showing a cross-sectional structure of the roller wall with the macromolecular polymer sealing cylindrical structure containing liquid according to an embodiment of the present invention; and in the drawings, the same reference numerals are used to denote the same elements or structures, where.

The outer wall of the roller is shown in FIG. 8, which is a schematic diagram showing a cross-sectional structure of the roller wall with the macromolecular polymer cylinder sealing cylindrical structure containing liquid according to an embodiment of the present invention. A liquid medium for transmitting ultrasound is stored in the roller, and the silicone rubber pipes 13 are provided on the outer wall of the roller. The silicone rubber pipe 13 is sealed and filled with the liquid 14. Specifically, a water-filled silicone rubber outer wall is provided in the embodiment of the present invention. The hollow silicone rubber pipe is sleeved on the inner wall of the roller coated with superglue, and then the inner wall of the hollow silicone rubber pipe is filled with water, i.e., the liquid 14. The wall thickness of the silicone rubber pipe is 0.5 mm, and the range covered in the y-direction is 120 mm. After being filled with water, the silicone rubber pipe bulges and maintains its shape under the action of elasticity. The thickest part of the outer wall is up to 14 mm from the inner wall surface. After the two rollers are fixed on the support according to the spatial arrangement described in embodiment 4, the water-filled silicone rubber outer walls of the two rollers are contiguous along their entire length.

The outer wall of the roller in the present embodiment can withstand larger deformations and thus can be employed to test the articles with different thicknesses. For example, the same device can test various models of soft-pack lithium-ion batteries with thicknesses ranging from 3 mm to 10 mm.

It is easily understood by those skilled in the art that the foregoing description is only the preferred embodiment of the present invention and is not intended to limit the present invention. Any modifications, equivalent replacements and improvements made within the spirit and principle of the present invention shall fall within the scope of protection of the present invention.

What is claimed is:

1. An ultrasonic scanning device, comprising:
   at least one pair of cylindrical rollers, each pair comprising a first cylindrical roller and a second cylindrical roller; and
   at least one pair of ultrasonic transducers, each pair comprising a first ultrasonic transducer and a second ultrasonic transducer;
   wherein,
   an axis of the first cylindrical roller is parallel to an axis of the second cylindrical roller; a first liquid is contained in the first cylindrical roller and the second cylindrical roller, and the first liquid is configured to couple an ultrasound to a test subject;
   during operation of the ultrasonic scanning device, the first cylindrical roller rotates around the axis of the first cylindrical roller clockwise, and the second cylindrical roller rotates around the axis of the second cylindrical roller counterclockwise, and the test subject passes between the at least one pair of cylindrical rollers and is tested by way of the ultrasound;
   when the test subject passes between the at least one pair of cylindrical rollers, an elastic deformation occurs on the at least one pair of cylindrical rollers or the test subject, and the test subject is in surface-to-surface contiguous contact with the at least one pair of cylindrical rollers to ensure propagation of the ultrasound;
   each pair of ultrasonic transducers is provided in a corresponding pair of cylindrical rollers; the first ultrasonic transducer of each pair of the ultrasonic transducers is arranged in the first cylindrical roller of the corresponding pair of cylindrical rollers; and the second ultrasonic transducer of each pair of ultrasonic transducers is arranged in the second cylindrical roller of the corresponding pair of cylindrical rollers;
   the at least one pair of ultrasonic transducers are configured to both emit and receive the ultrasound;
   the first ultrasonic transducer and the second ultrasonic transducer employ a flat ultrasonic transducer or a focused ultrasonic transducer;
   the first ultrasonic transducer of each pair of ultrasonic transducers is arranged opposite to the second ultrasonic transducer of the same pair of ultrasonic transducers; a line between an ultrasonic signal receiving center point and an ultrasonic signal emitting center point of each pair of ultrasonic transducers is coplanar with a plane of axes of the corresponding pair of cylindrical rollers;
   a size of a gap between each pair of cylindrical rollers is fixed; and
   when the test subject is tested, the at least one pair of ultrasonic transducers reciprocate in an axial direction of the at least one pair of cylindrical rollers; the test subject simultaneously contacts cylinder walls of the first cylindrical roller and the second cylindrical roller when passing through the gap; the first cylindrical roller is provided with an actuating device and rotated at a predetermined angular velocity; the second cylindrical roller is not provided with the actuating device and rotated under an action of friction when working.

2. The ultrasonic scanning device according to claim 1, wherein, an included angle between the axial direction of the at least one pair of cylindrical rollers and a horizontal plane is 15°-90°, and each of the first cylindrical roller and the second cylindrical roller is an open container.

3. The ultrasonic scanning device according to claim 2, wherein, an outer wall surface of the first cylindrical roller and the second cylindrical roller is made of a high-elastic macromolecular polymer material; the high-elastic macromolecular polymer material is silicone rubber, and the high-elastic macromolecular polymer material is sealed and filled with a second liquid.

4. The ultrasonic scanning device according to claim 2, further comprising: a horizontal conveyor belt;
   the at least one pair of cylindrical rollers have an equal height, and the axial direction of the at least one pair of cylindrical rollers is perpendicular to the horizontal plane; and
   the horizontal conveyor belt is configured to place the test subject, and the horizontal conveyor belt is located under the at least one pair of cylindrical rollers.

5. The ultrasonic scanning device according to claim 2, wherein, the included angle between the axial direction of the at least one pair of cylindrical rollers and the horizontal plane is 15°-40°;

an intersection line between the plane of the axes of the at least one pair of cylindrical rollers and the horizontal plane is perpendicular to the axes of the at least one pair of cylindrical rollers; and when the test subject is tested, the test subject enters the gap between the at least one pair of cylindrical rollers from above the at least one pair of cylindrical rollers, and is driven by a rotation of the at least one pair of cylindrical rollers to pass through the gap and falls under the at least one pair of cylindrical rollers.

6. The ultrasonic scanning device according to claim 2, wherein, the included angle between the axial direction of the at least one pair of cylindrical rollers and the horizontal plane is 15°-80°; and the plane of the axes of the at least one pair of cylindrical rollers is perpendicular to the horizontal plane.

7. A lithium-ion battery testing method,
wherein the method is performed by an ultrasonic scanning device with the lithium-ion battery as a test subject,
wherein the ultrasonic scanning device comprises:
at least one pair of ultrasonic transducers, each pair comprising a first ultrasonic transducer and a second ultrasonic transducer; and
at least one pair of cylindrical rollers, each pair comprising a first cylindrical roller and a second cylindrical roller;
wherein,
an axis of the first cylindrical roller is parallel to an axis of the second cylindrical roller; a first liquid is contained in the first cylindrical roller and the second cylindrical roller, and the first liquid is configured to couple an ultrasound to the test subject;
the first ultrasonic transducer and the second ultrasonic transducer employ a flat ultrasonic transducer or a focused ultrasonic transducer;
each pair of ultrasonic transducers is provided in a corresponding pair of cylindrical rollers;
the first ultrasonic transducer of each pair of the ultrasonic transducers is arranged in the first cylindrical roller of the corresponding pair of cylindrical rollers;
the second ultrasonic transducer of each pair of ultrasonic transducers is arranged in the second cylindrical roller of the corresponding pair of cylindrical rollers;
the at least one pair of ultrasonic transducers are configured to both emit and receive the ultrasound;
the first ultrasonic transducer of each pair of ultrasonic transducers is arranged opposite to the second ultrasonic transducer of the same pair of ultrasonic transducers;
a line between an ultrasonic signal receiving center point and an ultrasonic signal emitting center point of each pair of ultrasonic transducers is to be coplanar with a plane of axes of the corresponding pair of cylindrical rollers; and
a size of a gap between each pair of cylindrical rollers is fixed;
wherein, the method comprises:
operating the first cylindrical roller of each pair of cylindrical rollers by rotating the first cylindrical roller around the axis of the first cylindrical roller clockwise, and operating the second cylindrical roller of each pair of cylindrical rollers by rotating the second cylindrical roller around the axis of the second cylindrical roller counterclockwise, passing the test subject between the at least one pair of cylindrical rollers, and testing the test subject by way of the ultrasound, wherein passing of the test subject between the at least one pair of cylindrical rollers causes an elastic deformation to occur on the at least one pair of cylindrical rollers or the test subject, ensuring propagation of the ultrasound with the test subject in surface-to-surface contiguous contact with the at least one pair of cylindrical rollers;

reciprocating the at least one pair of ultrasonic transducers in an axial direction of the at least one pair of cylindrical rollers;

passing the test subject through the gap with the test subject simultaneously contacting cylinder walls of the first cylindrical roller and the second cylindrical roller;

rotating the first cylindrical roller, which is provided with an actuating device, at a predetermined angular velocity;

rotating the second cylindrical roller, which is not provided with the actuating device, under an action of friction;

forming an ultrasonic image of the test subject, and detecting an internal flaw and a health status of the lithium-ion battery.

8. The method according to claim 7, wherein, the ultrasonic scanning device further comprises:
an included angle between the axial direction of the at least one pair of cylindrical rollers and a horizontal plane is 15°-90°, and each of the first cylindrical roller and the second cylindrical roller is an open container.

9. The method according to claim 8, wherein, the ultrasonic scanning device further comprises an outer wall surface of the first cylindrical roller and the second cylindrical roller is made of a high-elastic macromolecular polymer material, wherein the high-elastic macromolecular polymer material is silicone rubber; and
the high-elastic macromolecular polymer material is sealed and filled with a second liquid.

10. The method according to claim 8, wherein, the ultrasonic scanning device further comprises a horizontal conveyor belt;
the at least one pair of cylindrical rollers have an equal height,
the axial direction of the at least one pair of cylindrical rollers is perpendicular to the horizontal plane;
the horizontal conveyor belt is configured to accommodate the test subject, and
the horizontal conveyor belt is located under the at least one pair of cylindrical rollers.

11. The method according to claim 8, wherein, the ultrasonic scanning device further comprises:
the included angle between the axial direction of the at least one pair of cylindrical rollers and the horizontal plane is 15°-40°;
an intersection line between the plane of the axes of the at least one pair of cylindrical rollers and the horizontal plane is perpendicular to the axes of the at least one pair of cylindrical rollers; and
when the test subject is tested, the test subject enters the gap between the at least one pair of cylindrical rollers from above the at least one pair of cylindrical rollers, and the test subject is driven by a rotation of the at least one pair of cylindrical rollers to pass through the gap and falls under the at least one pair of cylindrical rollers.

12. The method according to claim 8, wherein, the ultrasonic scanning device further comprises:
the included angle between the axial direction of the at least one pair of cylindrical rollers and the horizontal plane is 15°-80°; and the plane of the axes of the at least one pair of cylindrical rollers is perpendicular to the horizontal plane.

13. A method for obtaining an ultrasonic image,
wherein the method is performed by an ultrasonic scanning device,
wherein the ultrasonic scanning device comprises:
at least one pair of ultrasonic transducers, each pair comprising a first ultrasonic transducer and a second ultrasonic transducer; and
at least one pair of cylindrical rollers, each pair comprising a first cylindrical roller and a second cylindrical roller;
wherein
an axis of each first cylindrical roller is parallel to an axis of the corresponding second cylindrical roller; a first liquid is contained in each first cylindrical roller and each second cylindrical roller, and the first liquid is configured to couple an ultrasound to a test subject;
wherein the method comprises:
operating the first cylindrical roller of each pair of cylindrical rollers by rotating the first cylindrical roller around the axis of the first cylindrical roller clockwise, and operating the second cylindrical roller of each pair of cylindrical rollers by rotating the second cylindrical roller around the axis of the second cylindrical roller counterclockwise, passing the test subject between the at least one pair of cylindrical rollers, and testing the test subject by way of the ultrasound;
defining a normal direction of a plane of axes of the at least one pair of cylindrical rollers as x, defining an angular velocity of the at least one pair of cylindrical rollers as $\omega 1$, defining a minimum distance between the axes of the at least one pair of cylindrical rollers and the test subject during a working process as R, and defining a scanning time as t; wherein a displacement X of at least one pair of ultrasonic transducers relative to the test subject in an x-direction is $\omega_1 R_t$;
defining a direction parallel to the axial direction of the at least one pair of cylindrical rollers as y, wherein the at least one pair of ultrasonic transducers reciprocate in a y-direction with a frequency of p, and a relationship between a displacement Y of the at least one pair of ultrasonic transducers and t is Y=f(t);
defining a signal strength detected by the at least one pair of ultrasonic transducers at the scanning time t as S, establishing a relationship between S, X and Y according to t, X, Y and S at the scanning time t, and adding a false color on S and preparing an image according to the relationship between S, X and Y, wherein the image is the ultrasonic image of the test subject, and the ultrasonic image reflects ultrasonic transmission characteristics at different positions of the test subject, wherein passing of the test subject between the at least one pair of cylindrical rollers causes an elastic deformation to occur on the at least one pair of cylindrical rollers or the test subject; and
ensuring propagation of the ultrasound with the test subject in surface-to-surface contiguous contact with the at least one pair of cylindrical rollers.

14. The method according to claim 13, wherein, the ultrasonic scanning device further comprises:
the at least one pair of ultrasonic transducers are provided in the at least one pair of cylindrical rollers;
the first ultrasonic transducer is arranged in the first cylindrical roller; and
the second ultrasonic transducer is arranged in the second cylindrical roller;
the at least one pair of ultrasonic transducers are configured to both emit and receive the ultrasound;
the first ultrasonic transducer is arranged opposite to the second ultrasonic transducer; and
a line between an ultrasonic signal receiving center point and an ultrasonic signal emitting center point of the at least one pair of ultrasonic transducers is coplanar with a plane of axes of the at least one pair of cylindrical rollers.

15. The method according to claim 14, wherein, the ultrasonic scanning device further comprises:
a size of a gap between the at least one pair of cylindrical rollers is fixed; and
when the test subject is tested, the at least one pair of ultrasonic transducers reciprocate in an axial direction of the at least one pair of cylindrical rollers; the test subject simultaneously contacts cylinder walls of the first cylindrical roller and the second cylindrical roller when passing through the gap;
the first cylindrical roller, which is provided with an actuating device, is rotated at a predetermined angular velocity;
the second cylindrical roller is not provided with the actuating device, and the second cylindrical roller is rotated under an action of friction when working.

16. The method according to claim 15, wherein,
an included angle between the axial direction of the at least one pair of cylindrical rollers and a horizontal plane is 15°-90°, and each of the first cylindrical roller and the second cylindrical roller is an open container.

* * * * *